United States Patent
He et al.

(10) Patent No.: US 10,094,129 B2
(45) Date of Patent: Oct. 9, 2018

(54) FLOATING POOL DISPENSER

(71) Applicant: Ningbo Dongchuan Swimming Pool Equipment Co., Ltd., Ningbo (CN)

(72) Inventors: Huaizhong He, Ningbo (CN); Hu Zhang, Ningbo (CN)

(73) Assignee: NINGBO DONGCHUAN SWIMMING POOL EQUIPMENT CO., LTD., Ningbo (CN)

( * ) Notice: Subject to any disclaimer, the term of this patent is extended or adjusted under 35 U.S.C. 154(b) by 0 days.

(21) Appl. No.: 15/394,863

(22) Filed: Dec. 30, 2016

(65) Prior Publication Data

US 2017/0356209 A1 Dec. 14, 2017

(30) Foreign Application Priority Data

Jun. 13, 2016 (CN) .................... 2016 2 0569152 U

(51) Int. Cl.
*E04H 4/12* (2006.01)
*C02F 1/68* (2006.01)
*C02F 103/42* (2006.01)

(52) U.S. Cl.
CPC ........... *E04H 4/1281* (2013.01); *C02F 1/688* (2013.01); *C02F 2103/42* (2013.01); *C02F 2201/004* (2013.01)

(58) Field of Classification Search
CPC .. E04H 4/1281; C02F 1/688; C02F 2201/004; C02F 2103/42
USPC ......... 210/167.11, 242.1; 422/261, 265, 266, 422/276, 277
See application file for complete search history.

(56) References Cited

U.S. PATENT DOCUMENTS

| 3,607,103 | A | * | 9/1971 | Kiefer | .................... | B65D 83/00 |
| | | | | | | 206/0.5 |
| 4,606,893 | A | * | 8/1986 | Sangster | ............... | B01F 1/0027 |
| | | | | | | 116/200 |
| 4,643,881 | A | * | 2/1987 | Alexander | .............. | C02F 1/688 |
| | | | | | | 116/200 |
| 2012/0255893 | A1 | * | 10/2012 | Le Clair | ................. | C02F 1/688 |
| | | | | | | 210/167.11 |
| 2014/0170036 | A1 | * | 6/2014 | Sherman | ............. | B01F 13/0049 |
| | | | | | | 422/256 |

* cited by examiner

*Primary Examiner* — Fred Prince
(74) *Attorney, Agent, or Firm* — Gokalp Bayramoglu

(57) ABSTRACT

Exemplary embodiments of a floating pool dispenser are described. In one embodiment, a floating pool dispenser includes an outer assembly, an inner assembly, an end cover, and a lid. The inner assembly contains chemicals to be dissolved in a pool. The inner assembly moves vertically relative to the outer assembly in response to the continuous dissolving of chemicals.

10 Claims, 3 Drawing Sheets

FLOATING POOL DISPENSER

CROSS REFERENCE TO RELATED APPLICATIONS

This application claims priority from Chinese Patent Application No. 201620569152.8, filed on Jun. 13, 2016, the entire contents of which are incorporated herein by reference.

TECHNICAL FIELD

The present disclosure relates to pool dispenser devices for adding chemicals to the pool, and more particularly, to a floating pool dispenser that automatically notices a user when chemicals are running low.

BACKGROUND OF THE INVENTION

Pool dispensers are treatment devices used to improve water quality, and are widely used within pools. Existed pool dispensers in the art fail to provide a mechanism to inform their user when the chemicals within the dispenser are dissolved.

SUMMARY OF THE INVENTION

An objective of the present disclosure is to solve one of the problems in prior arts by providing a reliable pool dispenser which facilitates storage of chemicals.

The objective of the present disclosure can be implemented by a pool dispenser comprising an outer assembly comprising a top housing and a bottom housing removably attached to the top housing, said outer top housing having a plurality of movement guiding grooves arranged vertically; an inner assembly to be arranged within the outer assembly to store chemicals, said inner assembly having a plurality of guiding extrusions corresponding to the plurality of movement guiding grooves to facilitate vertical movement of the inner assembly relative to the outer assembly after the stored chemicals are dissolved; an end cover having a hole in the center arranged on top of the outer assembly, said hole being corresponding to an opening in the inner assembly; and a lid to be rotatably arranged within the hole of the end cover to seal the opening of the inner assembly.

In some embodiments, the top housing comprises an outer surrounding bow and an inner surrounding ring, the outer surrounding bow has a first plurality of slide-proof grooves along its exterior wall, and the plurality of movement guiding grooves are arranged on the interior wall of the inner surrounding ring.

In some embodiments, the floating pool dispenser further comprises a cleansing tube in the bottom housing and a pad arranged between the bottom housing and the cleansing tube, said cleansing tube being partially inserted into the inner surrounding ring and sealed with interior wall of the inner surrounding ring.

In some embodiments, the bottom housing comprises a first plurality of slits arranged vertically along its exterior wall, the cleansing tube comprises a second plurality of slits arranged vertically along its exterior wall, and the second plurality of slits have a width less than that of the first plurality of slits.

In some embodiments, the inner assembly is to be arranged inside the inner surrounding ring, and the inner assembly comprises a plurality of mounting grooves and a plurality of strengthening extrusions arranged on its exterior wall.

In some embodiments, the end cover is sealed with the outer surrounding bow, the inner assembly is partially inserted into the end cover, and the end cover comprises a plurality of mounting extrusions corresponding to the plurality of mounting grooves.

In some embodiments, the top housing further comprises one or more hangers.

In some embodiments, the bottom housing comprises a second plurality of slide-proof grooves along its exterior wall, and the second plurality of slide-proof grooves are arranged below the first plurality of slide-proof grooves.

In some embodiments. the lid comprises one or more L-shaped holding grooves on its exterior wall, and the end cover comprises one or more holding extrusions to fit into the holding grooves.

In some embodiments, the lid comprises one or more avows to indicate the holding grooves, and the end cover comprises one or more indicators to indicate the holding extrusions.

Based on the concept of the above disclosure, some of the technical effects to be expected are listed as follows: the entirety of the floating pool dispenser is improved in tears of reliability. The outer assembly is configured to stabilize the floating dispenser while the inner assembly which contains chemicals notice the user whether the chemicals have been dissolved. After the chemicals exhausts, for example, as a result of having dissolved in pool water, the inner assembly rises from underwater due to buoyancy force and become higher above water surface than the outer assembly which remains motionless. The embodiments of the present disclosure further implement movement guiding grooves, guiding extrusions and mounting extrusions in assembling the outer assembly, the inner assembly and the end cover. Such a configuration facilitates the assembling process and allows reliable fixation.

BRIEF DESCRIPTION OF THE DRAWINGS

Embodiments of the invention are illustrated by way of example, and not by way of limitation, in the figures of the accompanying drawings in which reference numerals refer to similar elements.

REFERENCE NUMBERS

10—outer assembly; 11—top housing; 111—outer surrounding bow; 1111—first plurality of slide-proof grooves; 112—inner surrounding ring; 1121—movement guiding grooves; 12—bottom housing; 121—first plurality of slits; 122—second plurality of slide-proof grooves; 13—cleansing tube; 131—second plurality of slits; 14—pad; 20—inner assembly; 21—guiding extrusions; 22—mounting grooves; 23—strengthening extrusions; 30—end cover; 31—mounting extrusions; 32—indicator; 40—lid; 41—holding grooves; 42—arrow; 50—hanger.

DETAILED DESCRIPTION OF THE INVENTION

The following description is presented to enable those skilled in the art to make and use the embodiments, and is provided in the context of a particular application and its requirements. Various modifications to the disclosed embodiments will be readily apparent to those skilled in the art upon reading the following description, and the general principles defined herein may be applied to other embodiments and applications without departing from the spirit and scope of the present disclosure. Therefore, the present disclosure is not limited to the embodiments shown, but is to be accorded the widest scope consistent with the principles and concepts disclosed herein.

Figure 1:
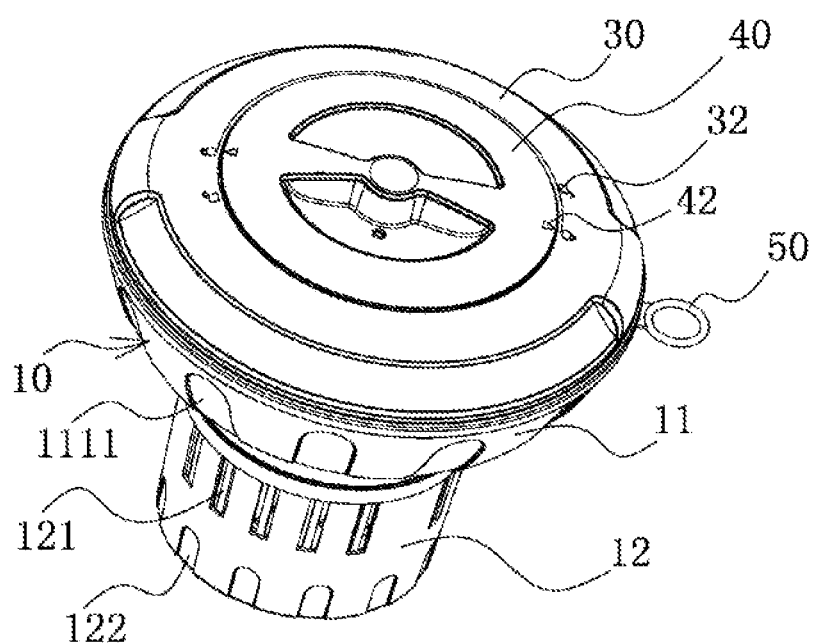
FIG. 1 is an illustration of an embodiment of a floating pool dispenser.
Figure 2:
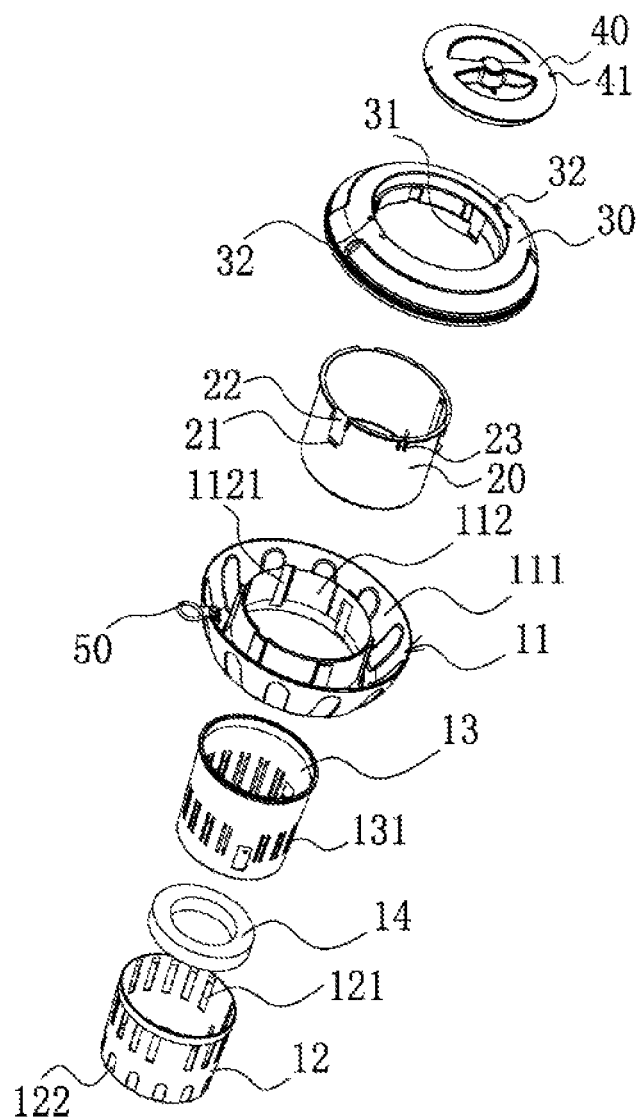
FIG. 2 is a breakdown illustration of an embodiment of a floating pool dispenser.
Figure 3:
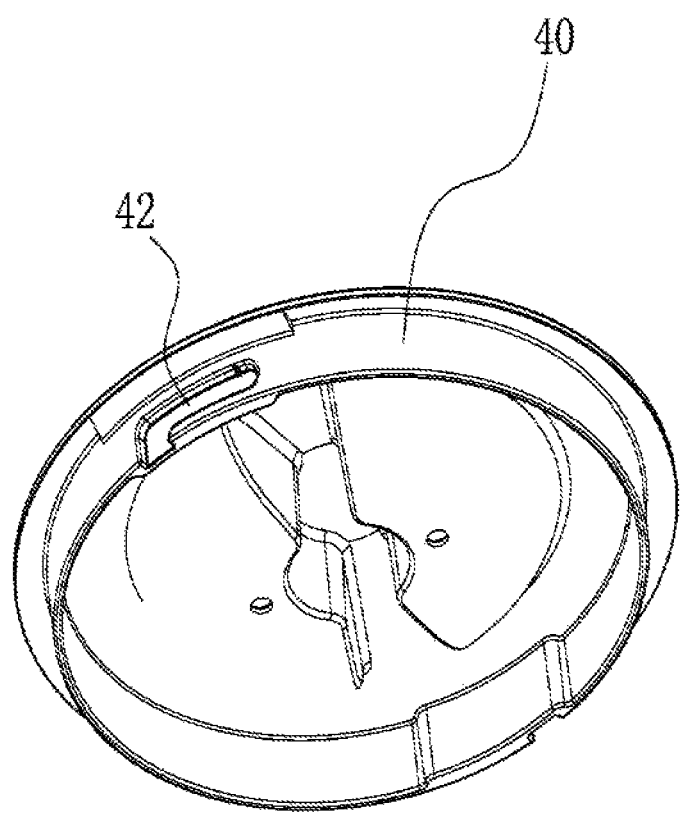
FIG. 3 is a breakdown illustration of an embodiment of an end cover.

As show in FIG. 1, FIG. 2, and FIG. 3, a floating pool dispenser according to some embodiments includes an outer assembly 10, an inner assembly 20, an end cover 30, and a lid 40. The outer assembly 10 comprises a top housing 11 and a bottom housing 12 removably attached to the top housing 11. The top housing 11 comprises an outer surrounding bow 111 and an inner surrounding ring 112. The outer surrounding bow 111 is configured as a bow-like structure with has a first plurality of slide-proof grooves 1111 along its exterior wall. The first plurality of slide-proof grooves 1111 are sunken in some embodiments. The inner surrounding ring 112 is configured as a ring-like structure and is thus hollow in the center. A plurality of movement guiding grooves 1121 are arranged on the interior wall of the inner surrounding ring 112. A cleansing tube 13 is installed within the bottom housing 12. A pad 14 is arranged between the bottom housing 12 and the cleansing tube 13. The cleansing tube 13 is partially inserted into the inner surrounding ring 112 and sealed with interior wall of the inner surrounding ring 112. The bottom housing 12 comprises a first plurality of slits 121 arranged vertically along its exterior wall, and the cleansing tube 13 comprises a second plurality of slits 131 arranged vertically along its exterior wall. The first plurality of slits 121 have a width greater than that of the second plurality of slits 131. In some embodiments, the inner assembly 20 is designed as a cannular structure for storing chemicals to be dispensed in a pool. The density of the inner assembly 20 is less than the density of water. The inner assembly 20 is to be arranged inside the inner surrounding ring 112. A plurality of mounting grooves 22, a plurality of guiding extrusions 21 and a plurality of strengthening extrusions 23 are arranged on the exterior wall of the inner assembly 20. Each of the plurality of guiding extrusions 21 corresponds to one of the plurality of movement guiding grooves 1121. The plurality of strengthening extrusions 23 are arranged along the upper edge of the exterior wall of the inner assembly 20. The end cover 30 has a hole in the center and is arranged on top of the outer assembly 10. The hole corresponds to an opening in the inner assembly 20 to allow deploying of chemicals. The end cover 30 is sealed with the outer surrounding bow 111. The inner assembly 20 is partially inserted into the hole of the end cover 30, and the end cover 30 further comprises a plurality of mounting extrusions 31 corresponding to the plurality of mounting grooves 22. The lid 40 is rotatably arranged within the hole of the end cover 30 to seal the opening of the inner assembly 20.

When placed into water, the outer assembly 10 is used to stabilize the dispenser floating at water level. The inner assembly 20 which contains chemicals to be dissolved can move relative to the outer assembly 10 due to weight decrease caused by the dissolving of chemicals. After the stored chemicals are dissolved or exhausted, at least a part of the inner assembly 20 can rise upwards relative to the floating outer assembly 10 due to the decreased density of the combination of the inner assembly 20 and its contents, and eventually emerges from water level. The density of the inner assembly 20 can be chosen so that at least a part thereof can emerge from water surface or becomes higher than the floating outer assembly 10 on condition that no chemicals are present within the inner assembly 20. Such a configuration will notice a user whether there are chemicals remaining in the inner assembly 20. In some embodiments, at least a part of the inner assembly 20 is assigned a color distinguishable from both the environment and other parts of the dispenser, such that a user will more readily notice the position of the inner assembly 20.

In some embodiments, the inner assembly 20 and the outer assembly 10 are connected by corresponding grooves and extrusions. The inner assembly 20 and the end cover 30 are connected by corresponding grooves and extrusions. The movement guiding grooves 1121 arranged in the outer assembly 10 and the guiding extrusions arranged in the inner assembly 20 enables easier installation and reliable fixation.

Further, the top housing 11 further comprises one or more hangers 50 to facilitate load and transportation of the pool dispenser. The bottom housing 12 comprises a second plurality of slide -proof grooves 122 along its exterior wall. The second plurality of slide-proof grooves are arranged below the first plurality of slide-proof grooves 121, so user experience associated with handling the pool dispenser may be improved. Moreover, production costs are also reduced.

In some embodiments, the lid 40 comprises one or more L-shaped holding grooves 41 on its exterior wall in order to facilitate mounting and dismounting of the lid 40. For example, the lid 40 may comprise two L-shaped holding grooves 41 positioned symmetrically on its exterior wall. The end cover 30 comprises one or more holding extrusions to fit into the holding grooves 41. In the case where two L-shaped holding grooves 41 are positioned on the lid 40, two holding extrusions are positioned on the end cover 30 in a fashion that each holding extrusion correspond to a holding groove 41. The lid 40 comprises one or more arrows to indicate the holding grooves 41, and the end cover 30 comprises one or more indicators 32 to indicate the holding extrusions.

As noted above, particular terminology used when describing certain features or aspects of the disclosure should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above detailed description explicitly defines such terms. Accordingly, the actual scope of the invention encompasses not only the disclosed examples, but also all equivalent ways of practicing or implementing the invention under the claims.

What is claimed is:

1. A floating pool dispenser, comprising:
   an outer assembly comprising a top housing and a bottom housing removably attached to the top housing, said top housing having a plurality of movement guiding grooves arranged vertically;
   an inner assembly arranged within the outer assembly to store chemicals, wherein said inner assembly includes a plurality of guiding extrusions corresponding to the plurality of movement guiding grooves to facilitate vertical movement of the inner assembly relative to the outer assembly after the stored chemicals are dissolved;
   an end cover having a hole in the center arranged on top of the outer assembly, wherein said hole corresponds to an opening in the inner assembly; and a lid configured to be rotatably arranged within the hole of the end cover to seal the opening of the inner assembly.

2. The floating pool dispenser of claim 1, Wherein
the top housing comprises an outer surrounding bow and an inner surrounding ring,
the outer surrounding bow has a first plurality of slide-proof grooves along its exterior wall, and
the plurality of movement guiding grooves are arranged on an interior wall of the inner surrounding ring.

3. The floating pool dispenser of claim 2 further comprising a cleansing tube in the bottom housing and a pad arranged between the bottom housing and the cleansing tube, wherein said cleansing tube is partially inserted into the inner surrounding ring and sealed with interior wall of the inner surrounding ring.

4. The floating pool dispenser of claim 3, wherein
the bottom housing comprises a first plurality of slits arranged vertically along an exterior wall of the bottom housing,
the cleansing tube comprises a second plurality of slits arranged vertically along an exterior wall of the cleansing tube, and
the second plurality of slits have a width less than that of the first plurality of slits.

5. The floating pool dispenser of claim 4, wherein
the inner assembly is configured to be arranged inside the inner surrounding ring, and
the inner assembly comprises a plurality of mounting grooves and a plurality of strengthening extrusions arranged on an exterior wall of the inner assembly.

6. The floating pool dispenser of claim 5, wherein
the end cover is sealed with the outer surrounding bow,
the inner assembly is partially inserted into the end cover, and
the end cover comprises a plurality of mounting extrusions corresponding to the plurality of mounting grooves.

7. The floating pool dispenser of claim 6, wherein the top housing further comprises one or more hangers.

8. The floating pool dispenser of claim 7, wherein the bottom housing comprises a second plurality of slide-proof grooves along the exterior wall of the bottom housing, and the second plurality of slide-proof grooves are arranged below the first plurality of slide-proof grooves.

9. The floating pool dispenser of claim 8, wherein the lid comprises one or more L-shaped holding grooves on an exterior wall of the lid, and the end cover comprises one or more holding extrusions to fit into the holding grooves.

10. The floating pool dispenser of claim 9, wherein the lid comprises one or more arrows to indicate the holding grooves, and the end cover comprises one or more indicators to indicate the holding extrusions.

* * * * *